United States Patent
Sahnoune et al.

(10) Patent No.: US 6,787,607 B2
(45) Date of Patent: Sep. 7, 2004

(54) THERMOPLASTIC ELASTOMERS HAVING ENHANCED FOAMING AND PHYSICAL PROPERTIES

(75) Inventors: Abdelhadi Sahnoune, Akron, OH (US); Terry M. Finerman, Rochester, MI (US); Sunny Jacob, Akron, OH (US); Sydney Ham, Burbank, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 10/203,323

(22) PCT Filed: Feb. 15, 2001

(86) PCT No.: PCT/US01/04924
§ 371 (c)(1),
(2), (4) Date: Oct. 28, 2002

(87) PCT Pub. No.: WO01/60905
PCT Pub. Date: Aug. 23, 2001

(65) Prior Publication Data
US 2004/0039075 A1 Feb. 26, 2004

Related U.S. Application Data

(60) Provisional application No. 60/182,852, filed on Feb. 16, 2000.

(51) Int. Cl.$^7$ .............................. C08F 8/00; C08L 9/00; C08L 23/00; C08L 23/04; C08L 27/12
(52) U.S. Cl. ..................... 525/191; 525/199; 525/232; 525/240
(58) Field of Search ................................ 525/191, 199, 525/232, 240

(56) References Cited

U.S. PATENT DOCUMENTS 6,166,143 A * 12/2000 Watanabe et al. ........... 525/208
6,359,071 B1 * 3/2002 Watanabe et al. ........... 525/184

* cited by examiner

*Primary Examiner*—Nathan M. Nutter
(74) *Attorney, Agent, or Firm*—William A. Skinner; William G. Muller

(57) ABSTRACT

An olefinic thermoplastic elastomer composition which includes an acrylic-modified polytetrafluoroethylene. When foamed, such compositions produce a very soft foam with improved processing properties and physical characteristics. A process of foaming and foamed articles are also disclosed.

11 Claims, No Drawings

THERMOPLASTIC ELASTOMERS HAVING ENHANCED FOAMING AND PHYSICAL PROPERTIES

This application claims the benefit of Provisional application Ser. No. 60/182,852 filed Feb. 16, 2000.

BACKGROUND OF THE INVENTION

1. Field of the Invention

This invention relates generally to thermoplastic elastomer (TPE) materials. Thermoplastic elastomers are broadly defined as rubber-like materials that, unlike conventional vulcanized rubbers, can be processed and recycled like thermoplastic materials, yet have properties and performance similar to that of vulcanized rubber at service temperatures. The invention more specifically relates to thermoplastic vulcanizates (TPV), which are thermoplastic elastomers with a cross-linked rubbery phase produced by the process of dynamic vulcanization. The thermoplastic vulcanizates of the invention are foamed materials produced by physical or chemical blowing agents, wherein processing characteristics and foam properties are improved by the inclusion of a modifier derived from polytetrafluoroethylene. The invention also relates to foamed articles obtainable by the process of the invention.

2. Description of the Prior Art

There has been considerable activity on the development of thermoplastic vulcanizate compositions, especially those based on polyolefin thermoplastic resins, which have good foaming properties, and on processes for producing foams having improved properties. U.S. Pat. No. 5,070,111, incorporated herein by reference, discloses a process of foaming thermoplastic elastomer compositions using water as the sole foaming agent. U.S. Pat. Nos. 5,607,629 and 5,788,889, both incorporated herein by reference, describe methods for the production of foamed thermoplastic elastomer profiles by extrusion with a water blowing agent. U.S. Pat. No. 5,824,400 discloses foamed thermoplastic elastomer compositions which incorporate styrenic elastomers. Published European Patent Application No. 0 860 465 teaches a method of foaming thermoplastic elastomers using a water containing chemical compound which releases water at temperatures above the melting point of the thermoplastic elastomer. Published European Patent Application 0 872 516 discloses the use of polypropylene resins having specific rheological properties to enhance the foaming performance of olefinic thermoplastic elastomers.

However, the problems of providing thermoplastic elastomer foams which are soft, with good surface smoothness, low water absorption, improved compression set and compression load deflection, and having fine and uniform cell structure have not been overcome by prior art.

SUMMARY OF THE INVENTION

The present invention is based on the discovery that superior thermoplastic elastomer foams can be produced by incorporating into the thermoplastic elastomer, prior to foaming, an acrylic-modified polytetrafluoroethylene. Incorporation of this additive provides a very soft foam product having a number of desirable attributes, including improved processability, high melt strength, high cell density and uniformity, smooth surface, low water absorption, with improved compression set and compression load deflection.

In detail the present invention relates to a process for foaming a thermoplastic elastomer using a physical or chemical blowing agent, wherein an acrylic-modified polytetrafluoroethylene is incorporated into the thermoplastic elastomer composition prior to foaming. Sufficient acrylic-modified polytetrafluoroethylene is incorporated to be effective in achieving the desired attributes. The invention also encompasses thermoplastic elastomer compositions containing the acrylic-modified polytetrafluoroethylene, and foamed articles prepared therefrom.

DESCRIPTION OF THE PREFERRED EMBODIMENTS

Thermoplastic Elastomer

Thermoplastic Resin Component

Thermoplastic resins suitable for use in the compositions of the invention include thermoplastic, crystalline polyolefin homopolymers and copolymers. They are desirably prepared from monoolefin monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferred, however, are monomers having 3 to 6 carbon atoms, with propylene being most preferred. As used in the specification and claims the term polypropylene includes homopolymers of propylene as well as reactor and/or random copolymers of propylene which can contain about 1 to about 30 weight percent of ethylene and/or an alpha-olefin comonomer of 4 to 16 carbon atoms, and mixtures thereof. The polypropylene can have different types of molecular structure such as isotactic or syndiotactic, and different degrees of crystallinity including materials with a high percentage of amorphous structure such as the "elastic" polypropylenes. Further polyolefins which can be used in the invention are high, low, linear-low and very low density polyethylenes, and copolymers of ethylene with (meth)acrylates and/or vinyl acetates.

The polyolefins mentioned above can be made using conventional Ziegler/Natta catalyst systems or by single site catalyst systems. Commercially available polyolefins may be used in the practice of the invention.

The amount of thermoplastic polyolefin resin found to provide useful thermoplastic elastomer compositions is generally from about 8 to about 90 weight percent. Preferably, the thermoplastic polyolefin content will range from about 9 to about 60 percent by weight.

Elastomer Component

Suitable rubbers include non-polar, rubbery copolymers of two or more alpha-monoolefins, preferably copolymerized with at least one polyene, usually a diene. Saturated monoolefin copolymer rubber, for example ethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6- octadiene; 1,3-cyclopentadiene; 1,4-cyclohexadiene; dicyclopentadiene (DCPD); and vinyl norbornene (VNB).

Butyl rubbers are also useful in the thermoplastic elastomer compositions. As used in the specification and claims, the term butyl rubber includes copolymers of an isoolefin and a conjugated monoolefin, terpolymers of an isoolefin with or without a conjugated monoolefin, divinyl aromatic monomers and the halogenated derivatives of such copolymers and terpolymers. Another suitable copolymer within the scope of the olefin rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from about 0.1 to about 10 weight percent. A preferred example is the brominated copolymer of isobutylene and para-methylstyrene. Natural rubbers are also olefin rubbers suitable for use in the thermoplastic elastomer composition.

The amount of rubber in the thermoplastic elastomer generally ranges from about 92 to about 10 weight percent. Preferably the olefin rubber content will be in the range of from about 40 to about 91 weight percent.

Additives

The thermoplastic elastomer may optionally contain reinforcing and non-reinforcing fillers, plasticizers, antioxidants, stabilizers, rubber processing oils, extender oils, lubricants, antiblocking agents, antistatic agents, waxes, foaming agents, pigments, flame retardants and other processing aids known in the rubber compounding art. Such additives may comprise up to about 70 weight percent, more preferably up to about 65 weight percent, of the total composition. Fillers and extenders which can be utilized include conventional inorganics such as calcium carbonate, clays, silica, talc, titanium dioxide, carbon black and the like. The rubber processing oils generally are paraffinic, napthenic or aromatic oils derived from petroleum fractions. The oils are selected from those ordinarily used in conjunction with the specific rubber or rubber component present in the composition.

In one particularly preferred embodiment of the invention, the inclusion of an adsorptive inorganic additive has been found to improve the odor properties of the foamed products. The addition of an additive such as magnesium oxide in the range of about 0.1 to about 3 weight percent, preferably about 0.5 to about 2 weight percent, based on the total composition, is effective in eliminating odors.

Processing

The rubber component of the thermoplastic elastomer is generally present as small, i.e. micro size, particles within a continuous thermoplastic resin matrix, although a co-continuous morphology or a phase inversion is also possible depending upon the amount of rubber relative to thermoplastic resin and the degree of vulcanization, if any, of the rubber. Preferably, the rubber is at least partially vulcanized, and most preferably it is fully vulcanized (crosslinked).

The partial or full crosslinking can be achieved by adding an appropriate rubber curative to the blend of thermoplastic olefin polymer and olefin rubber, and vulcanizing the rubber to the desired degree under vulcanizing conditions. It is preferred that the rubber be crosslinked by the process of dynamic vulcanization. As used in the specification and claims, the term dynamic vulcanization means a vulcanization or crosslinking (curing) process wherein the rubber is vulcanized under conditions of shear at a temperature above the melting point of the polyolefin component.

Those of ordinary skill in the art will appreciate the appropriate quantities and types of vulcanizing agents, and the conditions required to achieve the desired vulcanization. Any known crosslinking system can be used, so long as it is suitable under the vulcanization conditions for the elastomer component and it is compatible with the thermoplastic olefin polymer component of the composition. Crosslinking (curing) agents include sulfur, sulfur donors, metal oxides, phenolic resin systems, maleimides, peroxide based systems, hydrosilylation systems, high energy radiation and the like, both with and without accelerators and co-agents.

The terms fully vulcanized or completely vulcanized as used herein mean that the olefin rubber component of the composition has been crosslinked to a state in which the elastomeric properties of the crosslinked rubber are similar to those of the rubber in its conventional vulcanized state, apart from the thermoplastic elastomer composition. The degree of crosslinking (or cure) of the rubber can also be expressed in terms of gel content, crosslink density or amount of uncrosslinked rubber which is extractable by a rubber solvent. All of these descriptions are well known in the art. A typical partially crosslinked composition will have less than about 50 to less than about 15 weight percent of the elastomer extractable by a rubber solvent, while a fully crosslinked composition will have less than about 5 weight percent, and preferably less than about 3 weight percent, of the elastomer extractable by a rubber solvent.

Usually about 5 to about 20 parts by weight of the crosslinking agent or system are used per 100 parts by weight of the rubber component to be vulcanized.

As used herein, the terms thermoplastic elastomer and thermoplastic vulcanizate refer to blends of polyolefinic thermoplastic resin and vulcanized [cured; cross-linked] rubber [elastomer]. Such materials have the characteristic of elasticity, i.e. they are capable of recovering from large deformations quickly and forcibly. One measure of this rubbery behavior is that the material will retract to less than 1.5 times its original length within one minute, after being stretched at room temperature to twice its original length and held for one minute before release (ASTM D1566). Another measure is found in ASTM D412, for the determination of tensile set. The materials are also characterized by high elastic recovery, which refers to the proportion of recovery after deformation and may be quantified as percent recovery after compression. A perfectly elastic material has a recovery of 100% while a perfectly plastic material has no elastic recovery. Yet another measure is found in ASTM D395, for the determination of compression set.

Modified Polytetrafluoroethylene

The composition of the invention includes an acrylic-modified polytetrafluoroethylene (PTFE) component. This component is generally described as a mixture of a polytetrafluoroethylene and alkyl (meth)acrylate having from 5 to 30 carbon atoms. One such blend which is particularly suited for use in the process of the invention is available as Metablen™ A-3000, available from Mitsubishi Rayon Co., Ltd.

The amount of the modified polytetrafluoroethylene component in the composition of the invention generally ranges from about 0.1 to about 4 weight percent, based on the total weight of the composition including the thermoplastic resin component, the rubber component, additives and the modified polytetrafluoroethylene component. The preferred amount of modified polytetrafluoroethylene ranges from about 0.5 to about 2 weight percent, with about 1 to about 2 weight percent being most preferred. Alternatively, the amount of acrylic-modified polytetrafluoroethylene can be expressed in terms of the total weight of thermoplastic resin and modified polytetrafluoroethylene. The preferred amount of modified polytetrafluoroethylene, expressed in this manner, ranges from about 8 to about 30 weight percent with a range of about 15 to about 30 weight percent being most preferred.

In the preparation of thermoplastic elastomers of the invention, the acrylic-modified polytetrafluoroethylene was generally incorporated directly into the thermoplastic elastomer during production of the thermoplastic elastomer so that it was an integral part of the composition. Alternatively, the acrylic-modified polytetrafluoroethylene can be mechanically blended with a preformed thermoplastic elastomer composition, or it can be introduced into the foaming process simultaneously with the thermoplastic elastomer.

EXAMPLES

The combined thermoplastic elastomer and acrylic-modified polytetrafluoroethylene was fed into an extruder or other mixing device capable of maintaining melt temperatures in the range of about 165° C. to about 220° C. If the blowing agent was a solid material, it was also blended with the thermoplastic elastomer prior to introduction into the mixing device. When the blowing agent was a gas or liquid, it was injected into the mixing device through an appropriate inlet. The blowing agent was thus thoroughly dispersed in the molten thermoplastic elastomer, and the mixture was maintained at a pressure sufficient to prevent premature foaming. The mixture was passed through a die or other appropriate outlet, where foaming occurred. The foamed product was cooled in air or in a water mist.

In the following examples thermoplastic elastomers were prepared from blends of polypropylene thermoplastic resin and EPDM rubber, with common additives and processing aids. Acrylic-modified polytetrafluoroethylene was incorporated into the blends and the rubber component was cross-linked by dynamic vulcanization using a phenolic resin cure system. For the fabrication of foamed articles by an extrusion process, the thermoplastic elastomer was introduced into a single screw extruder and thoroughly melted. The blowing agent, water in the examples set forth in Table 1, was then injected under pressure into the molten thermoplastic elastomer at rates of 1.1 to 1.4 weight percent. The melt was mixed and conveyed, under pressure, to the extruder exit and through a shaping die. The hot and fragile foam was transferred to a conveyor belt where it was cooled by air and water mist. The foamed article may then be cut or shaped for specific applications. Foamed profiles can be either extruded alone as described or coextruded with a dense carrier.

The following measurement methods were used in evaluating the examples of the invention:

Tensile strength at break; tensile set; tensile modulus; elongation at break—ASTM D412 (ISO 37, type 2)

Shore hardness—ASTM D2240

Specific gravity—ASTM D792

Surface (Ra)—Surface finish was evaluated as the arithmetic average of roughness irregularities measured from a mean line with the sampling length, using a Surface Analyzer System from Federal Products Corporation, Providence, R.I.

Compression set—The sample was compressed inside spaced sample holders to 40% of its initial height, and held at 100° C. for 22 hours. The sample was removed and allowed to recover for 30 minutes at room temperature. Compression set was then determined as: $CS(\%)=(H_{initial}-H_{final})/(H_{initial}-H_0) \times 100$, where $H_0$ is the gap of the sample holder (60% of $H_{initial}$).

Compression load deflection—The force necessary to compress a 100 mm sample to 40% of its original height, at room temperature.

Water absorption—Two test methods were used to measure water absorption. In the first method (A) a weighed foam profile 50 mm long was submerged in water at room temperature two inches below the surface of the water. The specimen was allowed to remain submerged for either 24 hours at atmospheric pressure, or for three minutes at 23 inches Hg vacuum (above the surface of the water). After the appropriate time, the specimen was removed, blotted dry, weighed and the percent change in mass was calculated. In the second method (B) a weighed foam profile 254 mm long was submerged in water at room temperature eight inches below the surface of the water, with a one inch section of the specimen located above the water at each end. The specimen was allowed to remain thus submerged for either 24 hours at atmospheric pressure, or for five minutes at 26 inches Hg vacuum (above the surface of the water). After the appropriate time, the specimen was removed, dried, weighed and the percent change in mass was calculated.

TABLE 1

| Example => | Con. A | Con. B | 1 | 2 | 3 | 4 |
|---|---|---|---|---|---|---|
| Components 1 (parts by weight) | | | | | | |
| Polypropylene | 42 | 32 | 32 | 32 | 28 | 32 |
| EPDM rubber | 100 | 100 | 100 | 100 | 100 | 100 |
| Process oil | 150 | 150 | 150 | 150 | 150 | 150 |
| Additives/Curative | 63 | 63 | 63 | 63 | 63 | 63 |
| Metablen ™ A3000 | 0 | 0 | 3 | 7 | 7 | 7 |
| TPE Properties 1 | | | | | | |
| Hardness (Shore A) | 66 | 62 | 61 | 61 | 54 | 57 |
| Ultimate tensile strength (MPa) | 6.9 | 5.3 | 5.2 | 4.7 | 4.2 | 4.4 |
| Modulus-100(MPa) | 2.71 | 1.94 | 2 | 1.7 | 1.5 | 1.63 |
| Ultimate elongation (%) | 520 | 368 | 330 | 317 | 389 | 382 |
| Tensile set (%) | | 8 | 9 | 10 | 8.5 | 9 |
| Viscosity (poise) | 353 | 544 | 603 | 672 | 707 | 729 |
| Foam Properties 1 | | | | | | |
| Specific gravity (1.1 wt % water) | | 0.47 | 0.45 | 0.47 | 0.51 | 0.55 |
| Specific gravity (1.4 wt % water) | 0.45 | 0.4 | 0.4 | 0.42 | 0.45 | 0.49 |
| Surface (microns) | 9.1 | 8.1 | 7.8 | 6.3 | 8 | 7.4 |
| $H_2O$ absorption (test A)-Atmosphere (%) | 38 | 6.1 | 2.4 | 4.8 | 4.8 | 2.8 |
| $H_2O$ absorption (test A)-Vacuum (%) | 50 | 16.4 | 14.4 | 2.8 | 4.5 | 3.4 |

TABLE 1-continued

| Example => | Con. A | Con. B | 1 | 2 | 3 | 4 |
|---|---|---|---|---|---|---|
| Compression set (%) | 52 | 30 | 33 | 31 | 44 | 44 |
| Compression load deflection (kg) | 0.77 | 0.6 | 0.51 | 0.56 | 0.31 | 0.5 |

As can be seen from the examples, the foamed thermoplastic elastomer of the invention provides a smooth surface, low water absorption, good compression set and improved compression load deflection. Visual inspection shows that foam cell density is high and the cells are uniform in structure with cell size distribution in a narrow range. Microscopy indicates that about 60% of the cells have a diameter of less than 100 microns.

Additional examples were prepared using different thermoplastic elastomer formulations, and foams were generated using various levels of water as the blowing agent. The foam properties were evaluated, and the results are set forth in Tables 2 and 3.

TABLE 2

| Example⇒ | 5 | 6 | 7 |
|---|---|---|---|
| Components1 (weight %) | | | |
| EPDM rubber | 49.7 | 49.3 | 49 |
| Polypropylene | 9.1 | 9 | 9 |
| Process oil | 21.3 | 21.1 | 21 |
| Clay | 11.9 | 11.8 | 11.8 |
| ZnO | 0.6 | 0.6 | 0.6 |
| SnCl$_2$ | 0.4 | 0.3 | 0.3 |
| Curative | 1.1 | 1.1 | 1.1 |
| Carbon black | 4 | 3.9 | 3.9 |
| Modified PTFE | 2 | 2 | 2 |
| MgO | 0 | 0.8 | 1.4 |
| TPE Properties1 | | | |
| Hardness (Shore A) | 60 | 60 | 60 |
| Ultimate tensile strength (MPa) | 6.3 | 5.1 | 3.9 |
| Modulus-100 (MPa) | 2 | 1.8 | 1.7 |
| Ultimate elongation (%) | 390 | 470 | 510 |
| Viscosity (poise) | 375 | 685 | 485 |

TABLE 3

| Example=> | 5 | | | 6 | | | 7 | | |
|---|---|---|---|---|---|---|---|---|---|
| Blowing agent (wt %) | 0.9 | 1.3 | 1.8 | 0.9 | 1.3 | 1.8 | 0.9 | 1.3 | 1.8 |
| Density | 0.59 | 0.47 | 0.42 | 0.55 | 0.43 | 0.34 | 0.6 | 0.46 | 0.37 |
| Surface (microns) | 6.6 | 8.1 | 11.6 | 5.7 | 5.2 | 5.6 | 5.1 | 5.4 | 6.5 |
| H$_2$O absorption (test B)-Atmosphere (%) | 0.8 | 1.7 | 1.8 | 0.5 | 0.7 | 0.5 | 0.3 | 0.5 | 0.8 |
| H$_2$O absorption (test B)-Vacuum (%) | 0.15 | 0.16 | 0.18 | 0.5 | 0.1 | 0.1 | 1 | 1.5 | 2.7 |
| Compression set (%) | 31 | 27 | 27 | 41 | 42 | 40 | 47 | 55 | 63 |
| Compression load deflection (%) | 2.1 | 1.9 | 1.8 | 1 | 0.8 | 0.6 | 1 | 0.6 | 0.6 |

The materials used in the thermoplastic elastomers of Table 2 were EPDM rubber—Vistalon™ 3666 (ExxonMobil Chemical Co.); polypropylene—D008M™ (Aristech Chemical Corp.); process oil—Sunpar™ 150M; clay—Icecap K™ (Burgess); curative—SP-1045™ (Schenectady International); carbon black—Ampacet 49974 (Ampacet Corp.); modified PTFE—Metablen™ A3000 (Mitsubishi Rayon Co., Ltd.).

The foamed thermoplastic elastomer composition and the molded and shaped articles made therefrom are useful in a variety of applications such as handles and grips for tools or utensils, as well as weather strip for automotive and construction uses.

What is claimed is:

1. A thermoplastic elastomer composition comprising
   A) polyolefin thermoplastic resin,
   B) olefinic elastomer which is at least partially cured,
   C) an acrylic-modified polytetrafluoroethylene polymer, and
   D) optional additives.

2. The composition of claim 1 wherein said acrylic-modified polytetrafluoroethylene polymer is present in the range of about 0.1 to about 4 weight percent, based on the total composition.

3. The composition of claim 1 wherein said acrylic-modified polytetrafluoroethylene polymer comprises polytetrafluoroethylene which has been modified with an alkyl (meth)acrylate having from 5 to 30 carbon atoms.

4. The composition of claim 1 wherein said polyolefin thermoplastic resin is present in the range of about 8 to about 90 weight percent, and said olefinic elastomer is present in the range of about 92 to about 10 weight percent, based on the total composition.

5. The composition of claim 1 wherein said polyolefin thermoplastic resin is selected from the group consisting of polyethylene, polypropylene and mixtures thereof.

6. The composition of claim 1 wherein said olefinic elastomer is selected from the group consisting of ethylene-propylene copolymer rubber, ethylene-propylene-diene terpolymer rubber, and mixtures thereof.

7. The composition of claim 1 wherein said olefinic elastomer has been dynamically vulcanized so that less than 15 weight percent of the elastomer is extractable.

8. The composition of claim 1 further comprising a blowing agent.

9. The composition of claim 8 wherein said blowing agent is selected from the group consisting of water, steam, a water-generating material, or mixtures thereof.

10. The composition of claim 1 wherein one of the additives is magnesium oxide.

11. The composition of claim 9 wherein said magnesium oxide is present in the range of about 0.1 to about 3 weight percent, based on the total composition.

* * * * *